United States Patent [19]

Acker

[11] 4,326,598
[45] Apr. 27, 1982

[54] STEAM DRIVEN ROAD VEHICLE

[76] Inventor: Otto H. Acker, P.O. Box 2, Washougal, Wash. 98671

[21] Appl. No.: 155,523

[22] Filed: Jun. 2, 1980

[51] Int. Cl.³ .............................................. B60K 3/00
[52] U.S. Cl. ..................................... 180/304; 222/415
[58] Field of Search ............... 180/302, 303, 304, 310, 180/68 R; 222/415; 60/618

[56] References Cited

U.S. PATENT DOCUMENTS

| | | | |
|---|---|---|---|
| 672,941 | 4/1901 | Jackson | 180/303 |
| 682,194 | 9/1901 | Hess | 180/303 |
| 1,751,734 | 3/1930 | Harris | 180/303 |
| 1,830,386 | 11/1931 | Delling et al. | 180/304 |
| 2,358,671 | 9/1944 | Trippe | 180/304 X |
| 2,946,597 | 7/1960 | Simonsen | 222/415 X |
| 4,094,377 | 6/1978 | Biggs | 180/304 X |

*Primary Examiner*—Joseph F. Peters, Jr.
*Assistant Examiner*—Michael Mar
*Attorney, Agent, or Firm*—Eugene M. Eckelman

[57] ABSTRACT

A firebox, steam boiler and steam condenser are mounted in a road vehicle such as a passenger automobile. A steam powered drive member, such as a steam turbine, is operated by the steam pressure from the boiler and has drive connection with the drive axle of the vehicle. The vehicle carries a fuel bin for holding a supply of powdered fuel which is fed to the firebox. An electrical system is also associated with the vehicle to produce an auxiliary heating function for the boiler, and such electrical system includes a time control arranged to energize the heating element at a preset time. A temperature control is also provided. A water supply system for the boiler includes an auxiliary condenser to assist the main condenser in the system. Main and auxiliary reservoirs are provided to facilitate adequate storage of water in a compact arrangement.

1 Claim, 3 Drawing Figures

STEAM DRIVEN ROAD VEHICLE

FIELD OF THE INVENTION

This invention relates to new and useful improvement in steam driven road vehicles.

SUMMARY OF THE INVENTION

According to the present invention and forming a primary objective thereof, a steam driven road vehicle is provided having improved features facilitating convenient and efficient operation thereof and designed for utilizing a ready available, inexpensive powdered fuel.

In carrying out these objectives, the vehicle includes a conventional firebox, boiler, condenser, reservoir and steam powered drive means such as a turbine. A rear compartment is provided in the vehicle with a fuel bin therein arranged to hold a supply of powdered fuel for feeding to the firebox. The vehicle also has an electrical system including an electrical element for preheating the boiler. The electrical system includes time control means which may be arranged to energize the heating element at a preset time. Also, the heating element has temperature control means for purposes to be described. An auxiliary reservoir is used in conjunction with the main reservoir, such auxiliary reservoir preferably being mounted outside of the vehicle to conserve on interior space. An auxiliary condenser is also provided to assist the main condenser.

The invention will be better understood and additional objects and advantages will become apparent from the following description taken in connection with the accompanying drawings.

BRIEF DESCRIPTON OF THE DRAWINGS

DETAILED DESCRIPTION OF A PREFERRED EMBODIMENT

Figure 1:
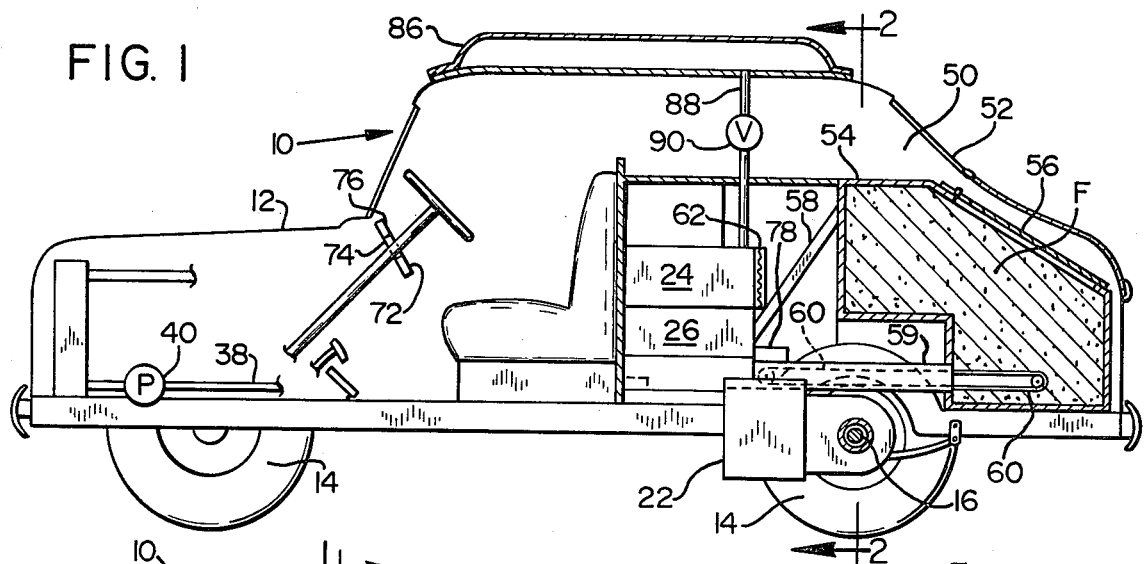
FIG. 1 is a sectional view taken longitudinally of a vehicle having features of the present invention embodied therein, this view being taken on the line 1—1 of FIG. 2.
Figure 2:
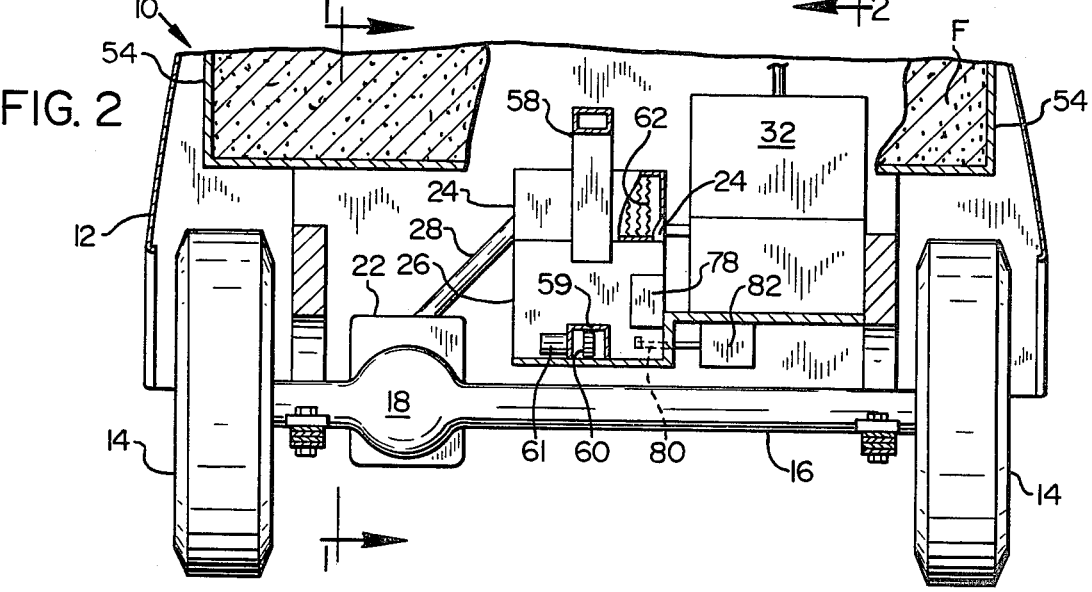
FIG. 2 is an enlarged fragmentary sectional view taken on the line 2—2 of FIG. 1.

With particular reference to the drawings and first to FIGS. 1 and 2, the invention resides in the combination of steam powered drive means and a road vehicle 10 such as a passenger automobile. The vehicle includes a body portion 12 with ground engaging front and rear wheels 14. Rear wheels 14 are associated with a drive axle 16 having the usual differential gear assembly 18.

Figure 3:
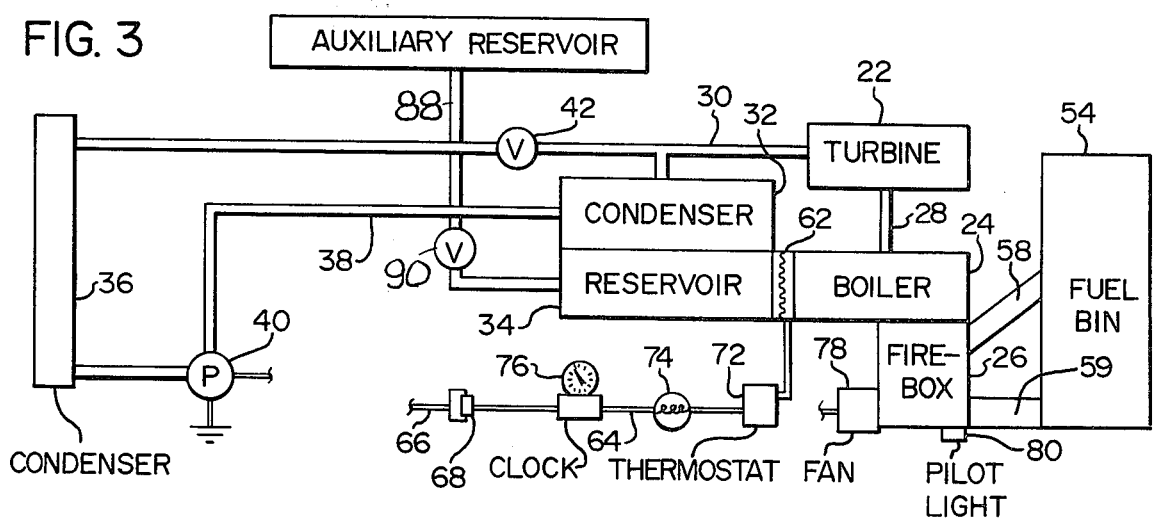
FIG. 3 is a schematic diagram of the steam power system and an electrical control associated therewith.

A steam drive apparatus 22, such as a steam turbine, is secured to the chassis of the vehicle and has a drive connection with the differential 18. A steam boiler 24 heated from a firebox 26 has outlet conduit connection means 28 with the turbine 22 for driving the turbine, and as seen in FIG. 3, the steam discharge from the turbine 22 leads by means of conduit means 30 to a condenser 32 and reservoir 34 for re-supply to the boiler.

In a preferred structure, conduit 30 from the turbine also leads through an auxiliary condenser 36 of conventional structure which as shown in FIG. 1 preferably is disposed at the front of the vehicle for efficient cooling. The discharge from such auxiliary condenser is connected back into the water supply such as to the condenser 32 by a conduit 38. Conduit 38 includes a pump 40 therein for moving the output of the auxiliary condenser to the main condenser 32. The pump 40 may comprise an electrically driven pump and operated from the vehicle electrical system in a conventional manner, the electrical system including the usual generator or alternator, not shown, driven by suitable means operated by the power system. Conduit 30 has a valve 42 between the condenser 36 and the condenser 32 for controlling flow therethrough, namely, such valve may shut off the flow to the condenser or meter the amount of flow as desired or necessary.

The present vehicle was designed so that the firebox will burn a non-liquid fuel such as powdered fuel. For this purpose, the body portion 12 of the vehicle includes an enlarged rear compartment 50 having a hatchback door 52 for access to a bin 54 arranged to hold a substantially large quantity of powdered fuel F. Fuel bin 54 has an access door 56 and also has a front gravity feed chute 58 leading from an upper portion thereof downwardly into the firebox 26 whereby the necessary fire can be maintained by the deposit of the fuel into the chute at necessary intervals by the operator. Also, a feed tube 59 may be employed which leads substantially horizontally from the bin 54 to the firebox. This feed tube has an endless chain conveyor 60 therein driven by an electric motor 61 suitably operated from the vehicle electrical system for feeding fuel to the firebox. Motor 61 preferably is a variable speed motor to feed fuel at a mere fire holding condition or at a full firing condition as desired.

The fuel bin 54 is sufficiently large to hold an adequate supply of powdered fuel to maintain steam power for at least as long as a conventional tankful of liquid fuel. One feature of the present invention is that the fuel can comprise a readily available material which may even comprise a bio-mass material reduced to powdered form.

The present system includes an electrical heating element 62 attached to the boiler 24 and connected in a circuit 64 to a source 66 of electrical energy. Such electrical source may comprise storage battery means carried in the vehicle or, as shown, plug-in means 68 for connection to a conventional 110-volt circuit. Included in the circuit 64 is an adjustable thermostat 72 for setting the degree of heating of element 62, an indicating light 74, and a control clock 76. Clock 76 is of conventional time control structure whereby to be preset so as to energize the heating 62 at a selected time, for a purpose to be described more fully hereinafter. Firebox 26 has a forced air fan 78 to maintain the necessary fire. This fan is electrically operated by circuitry of the vehicle. The firebox has a pilot burner 80 fed from a liquid fuel tank 82 carried on the vehicle. Burner 82 remains burning at all times that the vehicle is to be actively used to provide convenient initiation of a fire in the firebox.

In the operation of the present vehicle, the steam power means may be operated in a conventional manner but using, of course, the powdered fuel from the fuel bin 54 according to the invention. That is, heat generated by the boiler 24 operates the turbine 22 to drive the drive axle 16. Discharged steam from the turbine is returned by means of conduit 30 to the condenser 32 and deposited as liquid into the reservoir 34. For the purpose of providing extra cooling and condensing, valve 42 may be opened and pump 40 operated to drive the steam through auxiliary condenser 36.

Heating element 62 is used as a pre-heater for the boiler and also it may be used to provide sufficient heat in the system to prevent water from freezing in the event that the vehicle is subjected to freezing temperatures. Heating conditions of the heating element 62 in its pre-heating or warming conditions, are controlled by thermostat 72 which as shown in FIG. 1 may be mounted on the dashboard along with the indicating light 74 and clock 76.

Clock 76 may be set at a selected time so that the heating element 62 is energized as necessary such as a short time before use of the vehicle is contemplated or when freezing weather may occur. Thus, a pre-heating of the boiler can be accomplished ahead of time or also the boiler can be heated so that there will not be much of a waiting period for steam to be developed. With such pre-heating, the firebox can produce steam without much wait.

In certain conditions, auxiliary water may be necessary as a result of steam escape from the turbine, such as in summer months, and for this purpose an auxiliary reservoir 86 is carried by the vehicle and is piped into the reservoir 34 by a conduit 88 having a control valve 90 therein. The auxiliary reservoir is preferably carried integrally on the roof of the vehicle so as to conserve on interior space.

It is to be understood that the form of my invention herein shown and described is to be taken as a preferred example of the same and that various changes in the shape, size and arrangement of parts may be resorted to without departing from the spirit of my invention, or the scope of the subjoined claims. For example, a feed auger may be used in lieu of the feed conveyor 60 to feed material to the firebox 26.

Having thus described my invention, I claim:

1. A steam driven road vehicle comprising
   (a) a frame,
   (b) wheel means supporting said frame on the ground,
   (c) said wheel means including a drive axle,
   (d) a firebox, steam boiler and condenser supported on said frame,
   (e) steam powered drive means on said vehicle operated by steam from said boiler,
   (f) a water supply system on said vehicle supplying water to said boiler,
   (g) drive connection means connected between said powered drive means and said drive axle,
   (h) a fuel bin on said frame arranged to hold a supply of powdered fuel for feeding to the firebox,
   (i) first and second means connected between said fuel bin and said firebox for selectively conveying fuel from said fuel bin to said firebox, said first means comprising a power driven conveyor and said second means comprising a gravity feed chute,
   (j) an electrical system in said vehicle, including plug-in means arranged for detachable connection to a conventional 110 volt circuit,
   (k) an electrical pre-heating element on said boiler connected in said electrical system for producing pre-heat in said boiler,
   (l) heat control means in said electrical system controlling the temperature of output of said pre-heating element,
   (m) and time control means in said electrical system arranged to energize said pre-heating element at a preset time prior to driving the vehicle.

* * * * *